Figure 1C:
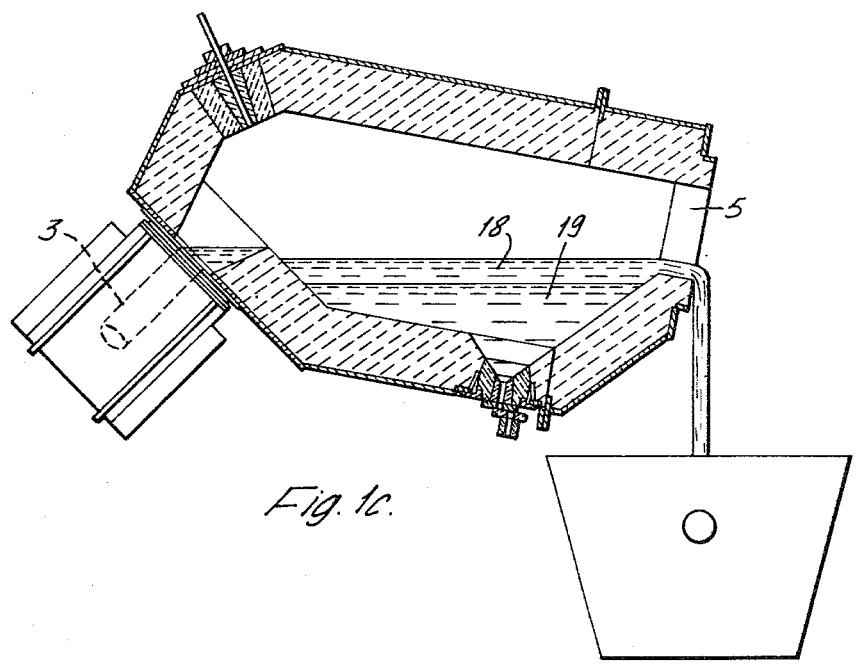

United States Patent [19]

Johnsson et al.

[11] 4,190,435
[45] Feb. 26, 1980

[54] PROCESS FOR THE PRODUCTION OF FERRO ALLOYS

[75] Inventors: M. K. Olof Johnsson, Degerfors; Rune H. Lindström, Hagfors; Per-Åke Lundström, Hagfors; Lars-Gunnar Norberg, Hagfors, all of Sweden

[73] Assignee: Uddeholms Aktiebolag, Hagfors, Sweden

[21] Appl. No.: 954,464

[22] Filed: Oct. 25, 1978

[51] Int. Cl.$^2$ ............................................. C21C 5/52
[52] U.S. Cl. ............................................. 75/12; 75/51; 75/53; 75/56; 75/57
[58] Field of Search ................... 75/11, 12, 129, 130.5, 75/53, 57, 56, 51

[56] References Cited

U.S. PATENT DOCUMENTS

| 3,934,863 | 1/1976 | Norberg | 266/224 |
| 3,942,978 | 3/1976 | Oberg et al. | 75/12 |
| 3,967,955 | 7/1976 | Folgero et al. | 75/12 |

FOREIGN PATENT DOCUMENTS 48-11220  6/1971  Japan ........................................... 75/57

Primary Examiner—Arthur J. Steiner
Attorney, Agent, or Firm—Murray and Whisenhunt

[57] ABSTRACT

A process for the production of ferro alloys containing manganese, chromium, molybdenum, and small amounts of carbon is provided. To a converter having a previous product melt and a slag rich in oxides of chromium or manganese is added a reducing agent having an excess of silicon or aluminum. Fluid is injected into the melt to create intensive agitation of the melt, slag and reducing agent, whereby the oxides in the slag are reduced. Lime is added to fix the resulting silicoc acid or aluminum oxide, and the slag with reduced chromium or manganese content is removed from the converter. Injection into the melt of a pulverulent oxide concentrate of chromium or manganese is continued, with additional lime, until the excess of silicon or aluminum in the melt, supplied by the reducing agent, reduces the injected oxide concentrate and the chromium and manganese are oxidized and go into the slag. The resulting product is partially tapped from the converter and the process is repeated.

6 Claims, 4 Drawing Figures

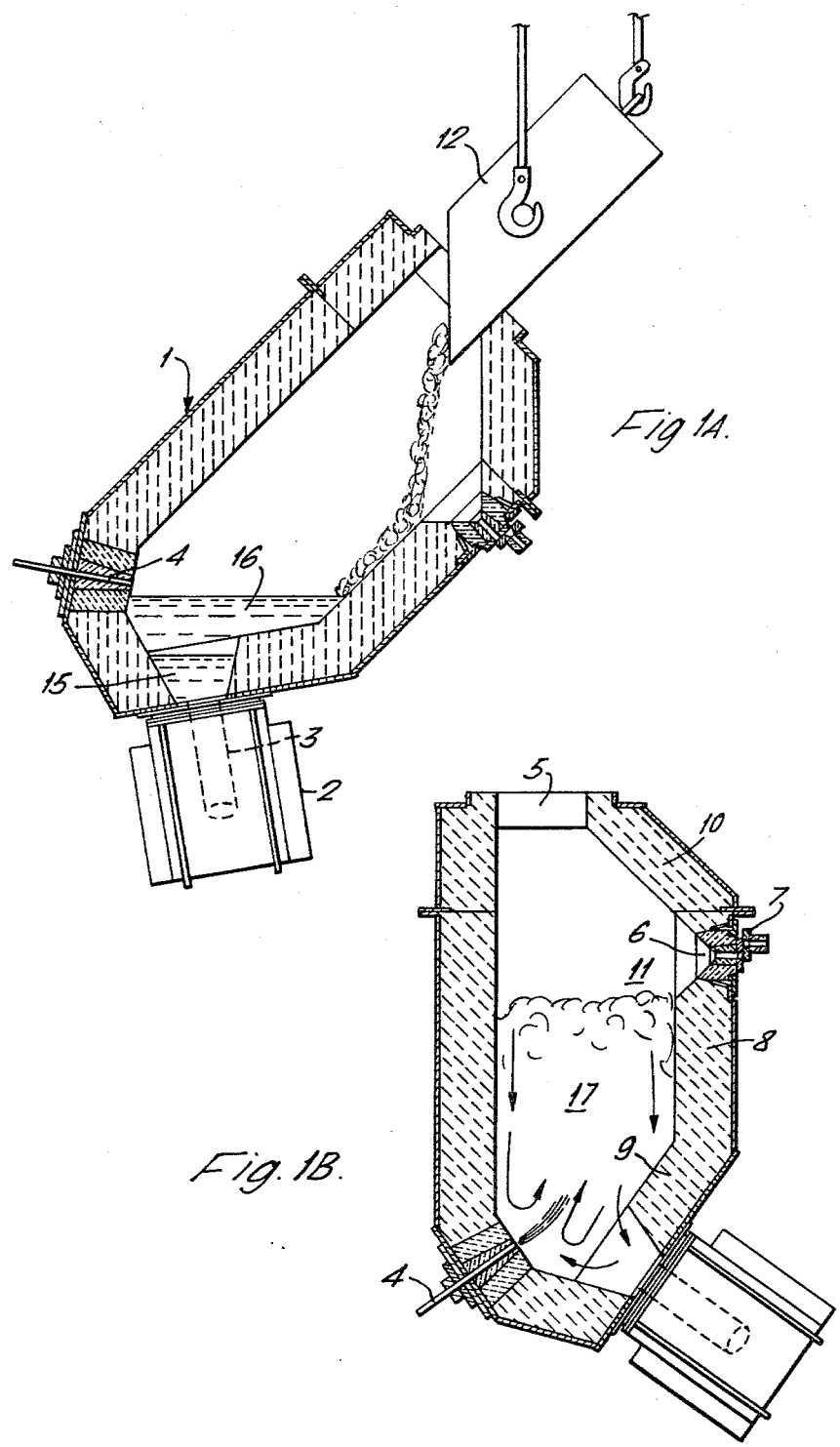

PROCESS FOR THE PRODUCTION OF FERRO ALLOYS

This invention relates to a process for the production of ferro-alloys of low silicon content and low or very low carbon content, and containing a metal having a high affinity for carbon. More specifically, the invention relates to a process for the production of low or very low carbon containing ferro-alloys consisting essentially of iron together with some of the metals manganese and chromium.

Low or very low carbon containing ferro-alloys containing metals having a high affinity for carbon, such as manganese and chromium, are usually made by any silico-thermal or aluminium-thermal process. Ferro-manganese affiné and suraffiné, for example, are made by any silico-thermal reduction in an electric furnace, usually by reduction of manganese ore with silicon-manganese. Ferro-chromium affiné and suraffiné are made similarly usually by silico-thermal reduction in the electric furnace. In this case the charge consists of chromium ore and ferro-silicon, the latter being alloyed with chromium if desired.

The silico-thermal processes hitherto utilized give a relatively poor metal yield if the alloys produced are to have a low silicon content. For example, for the production of ferro-chromium affiné, the attempt has been made to reduce the chromium losses by adding lime to the charge. The addition of lime binds silicic acid, so that more reduction silicon can be added without the silicon content of the product becoming excessive. Usually, however, large quantities of slag result and a requirement for a good metal yield is that operation should be carried out on the counter-current principle, i.e. the slag leaving the process must recently have been in contact with a melt having a high Si or Al content. Good agitation is also very important to a good metal yield.

The disadvantages of existing methods are largely as follows:

It is difficult to use fine-grain raw material. Fine-grain concentrate first has to be agglomerated; otherwise lump ore is used.

Poor agitation and hence poor contact between the ore, slag and reducing agents reduce the metal yield.

The energy consumption is high because of considerable losses due to the need to use several reaction vessels; due to the fact that the products have to be re-poured several times; due to the fact that silicon-containing metal often solidifies, and this necessitates crushing and re-melting; and due to the fact that the reaction heat is not safe-guarded in the case of silicon or aluminium oxidation.

The reaction heat in the case of silicon oxidation is developed in ladles in the interface between the slag and the molten metal. Lining wear is therefore concentrated to a limited area and is therefore very intensive, and this entails considerable lining costs.

Handling of the metal and slag charges is very labor-intensive.

Considerable problems arise in achieving an acceptable working environment, and protection of the external environment is also very expensive.

One object of this invention is to provide a process for the production of ferro-alloys consisting essentially of iron and at least one of the metals chromium and manganese and having a low or very low carbon content and a low silicon content, in which process the above disadvantages are eliminated or reduced. By "low carbon content" in this context is meant 1–2% C, while "very low carbon content" denotes less than 1% C and "low silicon content denotes 1% Si maximum, the percentages being by weight.

The process according to the invention comprises a number of steps repeated cyclically. More specifically, a working cycle comprises the following steps:

(a) to a converter containing a melt sump of the product to be produced, and a slag rich in oxide of chromium and/or manganese, in addition to iron, in the ferro-alloy in question, there is added a silicon-containing or aluminium-containing reducing agent having an excess of silicon or aluminium respectively for reduction of the said oxides in the slag, (b) the reducing agent is intimately mixed with the slag by injecting a fluid into the melt via at least one tuyere beneath the surface of the melt so that the melt, slag and reducing agent are intensively agitated, while at the same time, if necessary, heat is supplied to the melt by electrical induction so that the temperature in the bath is for the whole period kept above liquidus temperature, the effect of the intensive agitation being to create good conditions for effective reduction of metal oxides in the slag by reaction with silicon or aluminum respectively, while the excess silicon or excess aluminium remain dissolved in the melt, (c) lime is added before, simultaneously with, and/or after said injection of fluid, the lime being added in the quantity required to fix the silicic acid or aluminium oxide forming, (d) the slag of reduced chromium or manganese content is tapped from the converter when most of the said oxides in the slag have been reduced by the said reducing agents.

(e) a pulverulent concentrate containing an oxide of chromium and/or manganese is then injected by means of a carrier gas through the said tuyeres, (f) lime is added before, simultaneously with and/or after injection of the said oxide concentrate.

(g) heat is supplied to the melt during the injection of the oxide concentrate, by means of the electric induction, so that the temperature in the melt is for the whole period kept above the bath liquidus temperature, while the excess silicon or aluminium in the melt after being supplied with the said reducing agent reduces the injected metal oxides, (h) the injection of oxide concentrate is continued until the silicon content in the melt is reduced to the required content, while at the same time a certain quantity of chromium and/or manganese is oxidized and goes into the slag, which thus becomes rich in oxides of the said metals, the injection of the oxide concentrate being advantageously divided up into at least two operations with interim slag tapping, and (i) finally, the finished ferro-alloy is tapped through a tap hole beneath the slag surface.

For practical purposes it is desirable to leave in the converter a metal sump which should be of a size sufficient to fill at least the volume enclosed by the electric inductor. The chromium-containing and/or manganese-containing slag together with the said metal sump is retained in the converter, whereupon the process is repeated by a new addition of reducing agent, and so on. Reference has been made above to the introduction of chromium and/or manganese by this method but, of course, other metals can also be introduced in a similar way as well as, or instead of, chromium and/or manganese by using the appropriate reducible metal oxide.

The invention will now be explained in detail with reference to the accompanying drawing illustrating apparatus including electric induction heating in which the process of the present invention can be carried out.

FIGS. 1A–1D illustrate an electric induction converter operating in the various stages in the process according to the invention.

The equipment illustrated in FIGS. 1A to 1D is of a known type described previously, for example in U.S. Pat. No. 3,934,863. The main parts of the equipment comprise a converter 1 with a heating system in the form of an inductor 2, which encloses a melt conduit 3. A tuyere 4 is arranged for the injection of fluid into a melt in the converter. This fluid may, for example, comprise gases or suspensions of solid powder in a carrier gas. In the latter case, the equipment also includes a powder preparation unit (not shown). The converter is also provided with a top aperture 5 for charging molten material and solid material in piece form. A tap hole for tapping off melt is shown at reference 6. This tap hole is disposed in the converter front wall 8, i.e. that wall which faces in the same direction as the inductor 6 and the conduit 3. A slide valve is shown at 7. The front wall 8 together with a sloping bottom part 9 above the melt conduit 3 and a conical top part 10 forms a basin 11, with a volume such that when the converter is tipped into the horizontal position (FIG. 1D) it can accommodate beneath the orifice of the tuyere 4 the melt and slag obtained in the converter during the process according to the invention.

In the production of ferro-chromium affiné or suraffiné, the process according to the invention can be carried out as follows for example. Referring to FIG. 1A, assuming the converter to be in the starting position for a cycle, according to the invention the converter contains a sump 15 of molten metal and also a layer of slag 16. The metal melt 15 consists of ferro-chromium affiné or suraffiné which was produced in a previous working cycle. The slag 16, which may be molten or in particle form has a high $Cr_2O_3$ content. It also contains iron oxide (FeO). A reducing agent is added by means of a ladle 12. The reducing agent is advantageously ferro-silicon-chromium. A typical composition of this material is approximately 45% Si, 40% Cr, 15% Fe and 0.02–0.03% C. At the same time as reducing agent is added in this way, lime (CaO) is also advantageously added in a quantity sufficient to bind the silicic acid forming an oxidation of the silicon by reaction with $Cr_2O_3$ and FeO in the slag 16. In this case, ferro-silicon-chromium is produced in the same plant where the process according to the invention is intended to be performed, or if ferro-silicon-chromium is otherwise available in molten form, it is of course added to the converter in that form.

As soon as the reducing agent and lime have been added, the converter is turned to the vertical position (FIG. 1B) and a fluid, e.g. a gas, such as nitrogen gas, air or argon, is injected via the tuyere 4. The melt, slag, reducing agent and lime are thus agitated very intensively, thus promoting the reaction between silicon and chromium and iron oxides. By adding silicon in the form of ferro-silicon-chromium in a sufficient content in this phase of the operation, all the iron oxide and most of the chromium oxide in the slag will be reduced. According to the invention, ferro-silicon-chromium is an actual fact added in excess, i.e., more silicon is added than is required for the said reduction of iron and chromium oxides in the slag. This means that when all the iron oxide and chromium oxide in the slag have been reduced, the molten metal will contain a high silicon content. More specifically, the amount of ferro-silicon-chromium added is such that the silicon content of the melt, after the reduction process has reached equilibrium will be at least 5% and preferably at least 15%.

The slag formed in this way will thus mainly consist of $SiO_2.CaO$. The iron and chromium content is small. Against this, the slag volume is considerable. This slag, which has the reference 18 in FIG. 1C, is now tapped off through the top converter opening 5, as shown in FIG. 1C. Reference 19 denotes the high-silicon-containing melt beneath the slag layer 18. The melt conduit 3 is also filled with the same metal melt.

When substantially all the iron-containing and chromium-containing slag 18 have been tapped off through the opening 5, the converter is returned to the vertical working position (FIG. 1B). A suspension of chromium ore concentrate $Cr_2O_3.FeO$ is then injected through the tuyere 4. Lime is added by means of the ladle in the same way as shown in FIG. 1A. This addition of lime may be carried out before the concentrate injection starts or when it ceases. For this purpose the converter is tipped to the intermediate position shown in FIG. 1A. It is also possible to inject the lime in powder form together with the concentrate through the tuyere 4. The quantity of silicon present in the melt will now reduce the chromium and iron oxide injected via tuyere 4. The silicic acid is fixed in the same way as in the previously described lime phase. The temperature of the melt is kept at a suitable temperature for the reaction processes for the entire period, this temperature at least exceeding the metal liquidus temperature by supplying electrical energy by means of inductor 2, during which the metal in the conduit 3 is heated up. By the injection of concentrate and gas through the tuyere 4, the converter contents are very intensively agitated, and this both stimulates the metallurgical reactions and transports the heated metal from the conduit 3 to every part of the bath. The mixture of the various components set in motion during the different phases of the processes by the injection through the tuyere 4 has been given the general reference 17 in FIG. 1B.

Figure 1D:
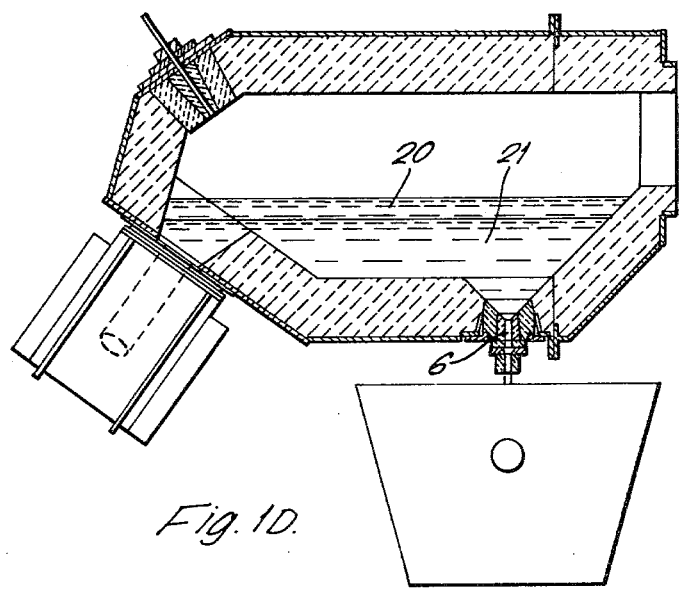

When the amount of concentrate injected via tuyere 4 is such that the silicon content has dropped to so low a value that an appreciable part of the injected concentrate starts to be difficultly reduced, i.e., slags, the concentrate injection is stopped. The chromium content of the slag depends upon the silicon content of the melt according to a certain functional relationship which in turn depends on the slag basicity. In the case of a basicity of 1.5, for example, it is advantageous to stop the first concentrate injection when the silicon content has dropped to about 5% in the melt, preferably as early as an 8% silicon content in the melt. The slag is then tapped off again, whereupon the converter is returned to the vertical position. Injection of chromium ore concentrate is then continued until the silicon content of the melt has dropped to the required level. The silicon content is advantageously reduced to less than 1%. The slab obtained in these conditions will contain a considerable chromium oxide content. This slag, which has reference 20 in FIG. 1D, is therefore retained in the converter, while the finished product, ferro-chromium affine or suraffine, reference 21 in FIG. 1D, is tapped out via tap holes 6. Only a relatively small quantity of the metal melt is saved, sufficient to fill the conduit 3 when the converter is returned to the starting position shown in FIG. 1A.

The procedure is the similar for the production of ferro-manganese affiné or suraffiné.

In this case, however, it must be borne in mind that manganese and manganese alloys have a lower melting point, a higher vapour pressure and a greater affinity for oxygen than chromium. Also, silicon-manganese (SiMn) with silicon contents of about 15-20% and carbon contents of about 1-2%, is an ordinary commercial product like ferro-manganese affine with 1-2% carbon. Silicon-manganese with silicon and carbon contents corresponding to the normal conditions in silicon-chromium, i.e. 40% silicon and about 0.05 to 0.10% carbon, also occur.

In the production of ferro-manganese affiné according to the invention, the first-mentioned silicon-manganese grade is advantageously taken as a basis, i.e. silicon-manganese containing about 15-20% silicon and about 1-2% carbon. When ferro-manganese suraffine is to be produced according to the invention, the last-mentioned silicon-manganese grade is advantageously taken as a basis, i.e., silicon-manganese containing about 30-50% silicon and less than about 0.2% carbon, usually about 40% silicon and 0.05 to 0.10% carbon. In both cases, but particularly the latter, the whole or part of the quantity of reduction silicon can be replaced by ferro-silicon.

As in the production of ferro-chromium with a low or very low carbon content, heat is supplied to the bath by an electrical inductor after the reducing agent has been intimately mixed with the slag by the injection of a fluid into the charge through a tuyere beneath the surface of the charge so that the charge, slag and reducing agent are intensively agitated. The temperature in the bath is kept above the liquidus temperature for the whole period. Since the melting point of manganese and ferro-manganese is less than for ferro-chromium, it is possible to perform the process at a lower temperature than in the case of chromium. This is also desirable in view of the higher vapour pressure of manganese.

In order to obtain a good manganese yield in view of the high affinity of manganese for oxygen, the silicon content of the metal on all the slag tappings must be high and the slag basicity, i.e. $CaO/SiO_2$ ratio, in these conditions, must be more than 1. In order effectively to be able to separate the metals and the slag, it is also advantageous to give the metal and the slag a temporary excess temperature on tapping the slag. The slag can also be fluxed with suitable additives, e.g. MgO, dolomite, $Al_2O_3$, $CaF_2$, and so on.

We claim:

1. Process for the production of ferro alloys having a low carbon content and containing in addition to iron at least one metal selected from the group consisting of manganese, chromium and molybdenum, characterised in that the process comprises the following steps which are repeated cyclically;

(a) adding to a converter containing a melt sump of the of the product to be produced, and a slag rich in oxide of chromium and/or manganese, in addition to iron, a silicon-containing or aluminum-containing reducing agent having an excess of silicon or aluminum respectively for reduction of the said oxides in the slag, (b) intimately mixing the reducing agent with the slag by injecting a fluid into melt via at least one tuyere beneath the surface of the melt so that the melt, slag and reducing agent are intensively agitated, maintaining the temperature in the melt for the whole period above liquidus temperature, whereby the intensive agitation creates good conditions for effective reduction of metal oxides in the slag by reaction with silicon or aluminum respectively, while the excess silicon or excess aluminum remain dissolved in the melt, (c) adding lime before, simultaneously with, and/or after said injection of fluid, the lime, being added in the quantity required to fix the silicic acid or aluminum oxide forming, (d) tapping the slag of reduced chromium or manganese content from the converter when most of the said oxides in the slag have been reduced by said reducing agents, (e) injecting a pulverulent concentrate containing an oxide of chromium and/or manganese by means of a carrier gas through the said tuyeres, (f) adding lime before, simultaneously with and/or after injection of the said oxide concentrate, (g) supplying heat to the melt during the injection of the oxide concentrate, by means of the electric induction, so that the temperature in the melt is for the whole period kept above the melt liquidus temperature, while the excess silicon or aluminum in the melt after being supplied with the said reducing agent reduces the injected metal oxides, (h) continuing the injection of said oxide concentrate until the silicon content in the melt is reduced to the required content, whereby at the same time quantities of chromium and/or manganese are oxidized and go into the slag, which thus becomes rich in oxides of the said metals, and (i) tapping the finished ferro-alloy through a tap hole beneath the slag surface, except for a melt sump ferro-alloy which is a volume sufficient to fill the space surrounded by the electric induction heating means, and repeating the process by a new addition of a reduction agent.

2. The process of claim 1 wherein in step (b) the temperature in the melt is maintained by supplying heat to the melt by electrical induction.

3. The process of claim 1 wherein in step (h) the injection of the oxide concentrate is in at least two separate injections with interim slag tapping.

4. The process of claim 1 wherein the carbon content of the ferro-alloy is up to 2%.

5. The process of claim 4 wherein the carbon content is less than 1%.

6. The process of claim 1 wherein the silicon content is no greater than 1%.

* * * * *